(12) United States Patent
Jung

(10) Patent No.: US 11,516,315 B2
(45) Date of Patent: Nov. 29, 2022

(54) COMMUNICATION DEVICE OF CONTROLLER AND COMMUNICATION METHOD THEREOF

(71) Applicants: HYUNDAI MOTOR COMPANY, Seoul (KR); KIA MOTORS CORPORATION, Seoul (KR)

(72) Inventor: Hojin Jung, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 150 days.

(21) Appl. No.: 16/677,051

(22) Filed: Nov. 7, 2019

(65) Prior Publication Data

US 2020/0396318 A1 Dec. 17, 2020

(30) Foreign Application Priority Data

Jun. 17, 2019 (KR) .......................... 10-2019-0071494

(51) Int. Cl.
*H04L 69/08* (2022.01)
*H04L 12/40* (2006.01)

(52) U.S. Cl.
CPC .............. *H04L 69/08* (2013.01); *H04L 12/40* (2013.01); *H04L 2012/40215* (2013.01); *H04L 2012/40273* (2013.01)

(58) Field of Classification Search
CPC ... H04L 12/40; H04L 12/40176; H04L 67/12; H04L 69/08; H04L 2012/40215; H04L 2012/40273; H04L 12/66; H04L 61/2503; H04L 12/40091; H04L 43/14; H04L 12/40052; H04L 12/403
See application file for complete search history.

(56) References Cited

U.S. PATENT DOCUMENTS

| 7,801,162 B2* | 9/2010 | Jeon | H04L 12/66 370/402 |
| 2012/0079149 A1* | 3/2012 | Gelvin | H04L 67/12 710/107 |
| 2013/0159466 A1* | 6/2013 | Mao | H04L 67/566 709/218 |
| 2014/0126584 A1* | 5/2014 | Hwang | H04L 12/413 370/466 |
| 2014/0215491 A1* | 7/2014 | Addepalli | H04L 63/0227 719/313 |

(Continued)

OTHER PUBLICATIONS

Specification of Diagnostic over IP, Release 4.4.0. (Year: 2018).*

*Primary Examiner* — Oussama Roudani
(74) *Attorney, Agent, or Firm* — Slater Matsil, LLP

(57) ABSTRACT

In an aspect of the disclosure, a communication method of a controller is disclosed. One form of a method may include: transmitting a diagnostic information request and attribute information of a diagnostic device to an Ethernet ECU; in response to the diagnostic information request, determining a protocol type of the diagnostic device based on the attribute information; controlling the Ethernet ECU to perform protocol conversion according to the determination result; and receiving a diagnostic message from the Ethernet ECU in response to the diagnostic information request by diagnostic device.

20 Claims, 7 Drawing Sheets

(56) References Cited

U.S. PATENT DOCUMENTS

| | | | | |
|---|---|---|---|---|
| 2016/0182341 | A1* | 6/2016 | Fischer | H04L 12/66 |
| | | | | 370/251 |
| 2018/0287815 | A1* | 10/2018 | Yamamoto | H04L 12/4625 |
| 2020/0145252 | A1* | 5/2020 | Torisaki | H04L 67/12 |
| 2021/0029103 | A1* | 1/2021 | Mizukoshi | H04L 63/08 |

* cited by examiner

FIG. 3

| N_PDU name | N_PCI bytes | | | |
| --- | --- | --- | --- | --- |
| | Byte #1 | | Byte #2 | Byte #3 |
| | Bits 7 _ 4 | Bits 3 _ 0 | | |
| SingleFrame(SF) | N_PCItype = 0 | SF_DL | N/A | N/A |
| FirstFrame(FF) | N_PCItype = 1 | FF_DL | | N/A |
| ConsecutiveFrame(CF) | N_PCItype = 2 | SN | N/A | N/A |
| FlowControl(FC) | N_PCItype = 3 | FS | BS | STmin |

FIG. 4

| Message direction: | client→vehicle | | |
|---|---|---|---|
| Message type: | Functionally addressed request message (read protocol identification Info Type identifier) | | |
| Data byte | Description | Byte value | Mnemonic |
| 0 | ISO 13400 – protocol version | 0x01 | – |
| 1 | ISO 13400 – inverse protocol version | 0xFE | – |
| 2 | ISO 13400 – payload type | 0x8001 | GH_PT |
| 3 | ISO 13400 – payload type | | GH_PT |
| 4 | ISO 13400 – payload length | 7 | GH_PT |
| 5 | ISO 13400 – payload length | | GH_PT |
| 6 | ISO 13400 – payload length | | GH_PT |
| 7 | ISO 13400 – payload length | | GH_PT |
| 8 | ISO 13400 – source address | e.g. 0x0E00 | SA |
| 9 | ISO 13400 – source address | | SA |
| 10 | ISO 13400 – target address | 0x0E00 | TA |
| 11 | ISO 13400 – target address | | TA |
| 12 | ISO 13400 – user data / ISO 27145-3 – ReadDataByIdentifier request SID | 0x22 | UD/RDBI |
| 13 | ISO 13400 – user data / ISO 27145-3 – DataIdentifier #1(HB) = ITID = protocol identification | 0xF8 | UD/DID_HB |
| 14 | ISO 13400 – user data / ISO 27145-3 – DataIdentifier #1(HB) = ITID = protocol identification | 0x10 | UD/DID_LB |

Bytes 0–7: DoIP Header
Bytes 8–14: DoIP Payload

FIG. 5

CAN :

| DoIP Header | | | |
|---|---|---|---|
| Protocol version(1) | Inverse Protocol version(1) | Payload Type(1) | Payload Length(4) |

| Payload (CAN Payload) | | | | | |
|---|---|---|---|---|---|
| SA(2) | TA(2) | Data1 PCI | Data1 SID | ... | Data N |

A

Ethernet : (DoIP)

| DoIP Header | | | |
|---|---|---|---|
| Protocol version(1) | Inverse Protocol version(1) | Payload Type(1) | Payload Length(4) |

| Payload (Ethernet Payload) | | | | | |
|---|---|---|---|---|---|
| SA(2) | TA(2) | Data1 SID | Data2 Sub-Function | ... | Data N |

B

COMMUNICATION DEVICE OF CONTROLLER AND COMMUNICATION METHOD THEREOF

CROSS-REFERENCE TO RELATED APPLICATION(S)

This application claims priority to and the benefit of Korean Patent Application No. 10-2019-0071494, filed on Jun. 17, 2019, the entire contents of which is incorporated herein by reference.

FIELD

Embodiments and implementations of the disclosure relate to a communication device of a controller and a communication method thereof, and more particularly, to a communication device of a controller and a communication method for ensuring compatibility between controllers using different protocols.

BACKGROUND

The statements in this section merely provide background information related to the present disclosure and may not constitute prior art.

As a vehicle has various electronic devices, mutual control between controllers mounted in the vehicle is increased, and data transmitted and received is increased. Therefore, in addition to the existing CAN (Controller Area Network) communication protocol, a vehicle communication protocol adopts various methods such as CAN with flexible data rate (CAN-FD) and Ethernet.

Currently, vehicles may be equipped with a central gateway that manages various communication protocols. If a CAN diagnostic device is connected to the vehicle, a collision occurs at a central gateway due to an incompatibility with the ethernet. The disclosed invention is conceived to address the above problems.

SUMMARY

Therefore, it is an aspect of the present disclosure to provide a communication device of a controller and a communication method thereof, capable of ensuring compatibility without putting a load on a central gateway between a controller and a diagnostic device.

In one aspect of the disclosure, a communication method of a controller is disclosed. In one form, a method may include: transmitting a diagnostic information request and attribute information of a diagnostic device to an Ethernet ECU; in response to the diagnostic information request, determining a protocol type of the diagnostic device based on the attribute information; controlling the Ethernet ECU to perform protocol conversion according to the determination result; and receiving a diagnostic message from the Ethernet ECU in response to the diagnostic information request by diagnostic device.

In some implementations, the diagnostic device may include any one of a CAN diagnostic device or an ethernet diagnostic device.

In response to the diagnostic information request, determining a protocol type of the diagnostic device based on the attribute information may include: determining whether the diagnostic device is the CAN diagnostic device or the ethernet diagnostic device based on the attribute information including Protocol Control Information (PCI).

In response to the diagnostic information request, determining a protocol type of the diagnostic device based on the attribute information may include: determining that the diagnostic device is the ethernet diagnostic device when a length of a payload of a DoIP (Diagnostic over IP) header is not 12 bytes.

In response to the diagnostic information request, determining a protocol type of the diagnostic device based on the attribute information may include: determining that the diagnostic device is the ethernet diagnostic device when a length of a payload of a DoIP (Diagnostic over IP) header is 12 bytes and a SID (Service ID) belongs to a fifth byte of the payload.

In response to the diagnostic information request, determining a protocol type of the diagnostic device based on the attribute information may include: determining that the diagnostic device is the CAN diagnostic device when a length of a payload of a DoIP (Diagnostic over IP) header is 12 bytes and the PCI information belongs to a fifth byte of the payload.

Receiving a diagnostic message from the Ethernet ECU in response to the diagnostic information request by the diagnostic device may include: converting the diagnostic message into a divided CAN frame when the diagnostic device is the CAN diagnostic device.

Receiving a diagnostic message from the Ethernet ECU in response to the diagnostic information request by the diagnostic device may include: not converting the diagnostic message when the diagnostic device is the ethernet diagnostic device.

In another aspect of the disclosure, a communication device of a controller is disclosed. In one form, a communication device of a controller may include: a diagnostic device; an ethernet ECU configured to receive a diagnostic information request and an attribute information from the diagnostic device and provide a diagnostic message to the diagnostic device; and a processor, wherein the processor is configured to determine a protocol type of the diagnostic device based on the attribute information and control the ethernet ECU to perform protocol conversion according to the determination result.

The diagnostic device may include any one of a CAN diagnostic device or an ethernet diagnostic device.

In some implementations, the processor is configured to determine whether the diagnostic device is the CAN diagnostic device or the ethernet diagnostic device based on the attribute information including Protocol Control Information (PCI).

In some implementations, the processor is configured to determine that the diagnostic device is the ethernet diagnostic device when a length of a payload of a DoIP (Diagnostic over IP) header is not 12 bytes.

In some implementations, the processor is configured to determine that the diagnostic device is the ethernet diagnostic device when a length of a payload of a DoIP (Diagnostic over IP) header is 12 bytes and a SID (Service ID) belongs to a fifth byte of the payload In some implementations, the processor is configured to determine that the diagnostic device is the CAN diagnostic device when a length of a payload of DoIP (Diagnostic over IP) header is 12 bytes and the PCI information belongs to a fifth byte of the payload.

In some implementations, the ethernet ECU is configured to convert the diagnostic message into a divided CAN frame when the diagnostic device is the CAN diagnostic device.

In some implementations, the ethernet ECU is configured not to convert the diagnostic message when the diagnostic device is the ethernet diagnostic device.

Further areas of applicability will become apparent from the description provided herein. It should be understood that the description and specific examples are intended for purposes of illustration only and are not intended to limit the scope of the present disclosure.

DRAWINGS

These and/or other aspects of the disclosure will become apparent and more readily appreciated from the following description of the embodiments, taken in conjunction with the accompanying drawings of which:

FIG. 3 is a view for illustrating PCI (Protocol Control Information) used in a CAN diagnostic device.

FIG. 4 is a view for illustrating PCI (Protocol Control Information) used in an ethernet diagnostic device.

FIG. 5 is a view for illustrating a process of determining PCI in an ethernet controller.

Figure 1:
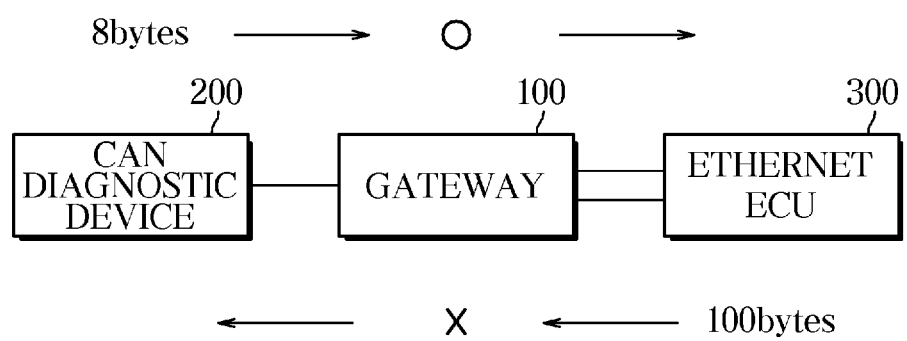
FIG. 1 is a diagram illustrating a problem of communication between different protocols.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of embodiments and implementations of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, operation principles and embodiments and implemenations of the disclosure will be described with reference to the accompanying drawings.

First, a problem in diagnosing an Ethernet ECU 300 with a CAN diagnostic device 200 will be described with reference to FIG. 1.

A payload size of a protocol transmitted by the CAN diagnostic device through a gateway 100 is 8 bytes, and it is easy to change the protocol into a DoIP (Diagnostic over IP) structure. However, when the ethernet ECU 300 transmits 100 bytes to the ethernet ECU 300 through the gateway 100 in response to the diagnostic request of the CAN diagnostic device 200, the following problems occur.

Basically, the CAN protocol has a payload size of 8 bytes, and the ethernet protocol can transmit and receive data having a payload size of 1500 bytes or more based on TCP. Therefore, when the Ethernet ECU 300 transmits data exceeding 8 bytes, the gateway 100 cannot process the data, and thus the diagnostic session is terminated because the data does not reach the CAN diagnostic device 200. Here, the payload refers to data excluding management information for transmission processing among data transmitted by the ethernet ECU 300. For example, the payload may be data in which header information or metadata is excluded.

On the other hand, when the ethernet ECU 300 transmits more than 8 bytes of data, the gateway 100 secures compatibility between the CAN diagnostic device 200 and the ethernet ECU 300 through TP (Transport Protocol) processing. Here, the gateway 100 adopts a method of dividing and transmitting the data to be transmitted into 8 byte units.

However, since the buffer size of the gateway 100 is limited and the gateway 100 is connected to a plurality of diagnostic devices, the overall conversion processing time and diagnostic time are delayed. In addition, the gateway 100 should have a matching table between the CAN ID and the ethernet ECU 300, perform TP processing on all ethernet protocol data and retain a minimum separation time (STmin) and a block size for each ECU required for flow control. Here, Block Size is information on how much data is sent at one time, and STmin is information on minimum time interval between message transmissions belonging to a divided frame. In addition, the transmitted data passes through the internal security algorithm of the gateway 100. In this process, a transmission time is delayed or a diagnosis session is interrupted.

As described above, when the gateway 100 is responsible for TP processing for the CAN protocol in a central processing manner, the gateway 100 is overloaded due to excessive data throughput, which prevents smooth communication between the diagnostic device and the controller. Thus, the disclosed invention adopts a manner in which the Ethernet ECU automatically responds appropriately to the diagnostic device protocol, rather than the central processing manner of the gateway.

Figure 2:
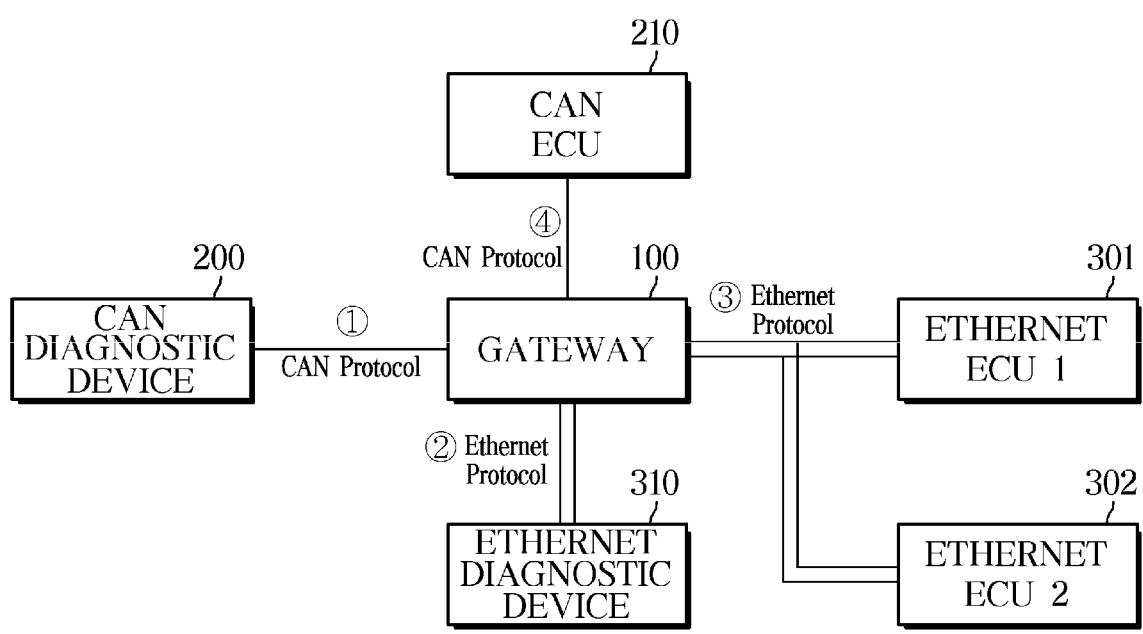
FIG. 2 is a control block diagram of one form of a communication device of controller.

Referring to FIG. 2, when the Ethernet ECUs 301 and 302 perform a diagnosis, it is desirable to determine whether the diagnostic request is sent from which diagnostic device. For example, the ethernet ECU determines whether a diagnostic request is sent from the CAN diagnostic device 200 or the ethernet diagnostic device 310, and performs TP processing into the data that matches the protocol of the determined diagnostic device.

Meanwhile, the communication device of the controller may include at least one processor (not shown) for executing a program related to the operation of the ethernet ECUs 301 and 302 and at least one memory (not shown) in which the program is stored. The memory and the processor may be integrated on a single chip or may be physically separated.

Meanwhile, as attribute information provided by the CAN diagnostic device 200, protocol control information (PCI) may be included in the payload region. Referring to FIG. 3, a data length value is shown in a first byte of a single frame, and data related to actual diagnosis is added thereafter. If the data transmitted by the CAN diagnostic device 200 exceeds 8 bytes, the multi-frame data including PCI information called Flow Control is transmitted.

In contrast, the data format used in the ethernet diagnostic (DoIP) performed by the ethernet diagnostic device 310 is different from the data format used in the CAN diagnostic device 200. Referring to FIG. 4, the DoIP header portion of the ethernet diagnosis includes PCI which is attribute information provided by the CAN diagnostic device 200. As shown in FIG. 4, attribute information of bytes 0 through 7 in ethernet diagnosis includes information about PCI adopted in CAN diagnosis (protocol version, inverse protocol version, payload type, payload length). Therefore, the payload section utilized for the actual diagnostic data starts with the Service ID assigned to the 12th byte.

Therefore, ethernet ECU may use DoIP, an international standard format without any protocol conversion processing, and does not need to change the header of DoIP. Eventually, the gateway 100 may omit the routing procedure between the heterogeneous domains and move the CAN payload to the DoIP payload as it is to ensure compatibility between the two.

In some implementations, the ethernet ECU may check the 12th byte or the 13th byte at which the actual payload data starts, and determine whether the data is information about a diagnostic service or PCI information. Subsequently, if it is confirmed that the data is a CAN protocol including PCI, the Ethernet ECU may transmit a diagnostic message by performing TP processing to fit the frame of the CAN diagnostic device. Alternatively, the ethernet ECU may transmit a diagnostic message to fit the frame of the ethernet diagnostic device if the data is in a DoIP format without PCI.

Hereinafter, a process of determining information about PCI by the Ethernet ECU will be described in more detail with reference to FIGS. 5 to 7.

In general, the payload data sent by the CAN diagnostic device should not exceed 8 bytes, even if the payload data does not fill 8 bytes, the payload data fills the padding byte so that the payload data fits into 8 bytes. The length of the payload transmitted by the CAN diagnostic device is set to 12 bytes (Source Address (2 bytes)+Target Address (2 bytes)+CAN payload data (8 bytes)=12 bytes)). Thus, the processor may determine that the diagnostic device is an ethernet diagnostic device if the payload length of the DoIP header is not 12 bytes.

In addition, if the payload of the DoIP (Diagnostic over IP) header has a length of 12 bytes and the PCI information belongs to the fifth byte (A) of the payload, the processor may determine that the diagnostic device is a CAN diagnostic device. For example, as shown in FIG. 6, when the CAN diagnostic device 200 requests a diagnostic message from the ethernet ECU 300 and when the fifth and sixth bytes of the payload included in the attribute information of the CAN diagnostic device 200 are searched and found to be PCI and SID information, Conversion processing may be performed in a protocol suitable for the CAN diagnostic device 200 to provide the divided data to the CAN diagnostic device 200. That is, the ethernet ECU may convert the diagnostic message to be sent to the CAN diagnostic device to the CAN frame.

In contrast, if the payload length of the DoIP header is 12 bytes and the SID (Service ID) belongs to the fifth byte B of the payload, the processor may determine that the diagnostic device is an ethernet diagnostic device. Here, as shown in FIG. 7, when the ethernet diagnostic device 310 requests a diagnostic message from the ethernet ECU 300, when the fifth byte of the payload included in the attribute information of the ethernet diagnostic device 310 is searched and found to be SID information, the data may be collectively provided to the ethernet diagnostic device 310 without performing a separate conversion process. That is, the ethernet ECU does not convert diagnostic messages to be sent to the ethernet diagnostic device.

Figure 6:
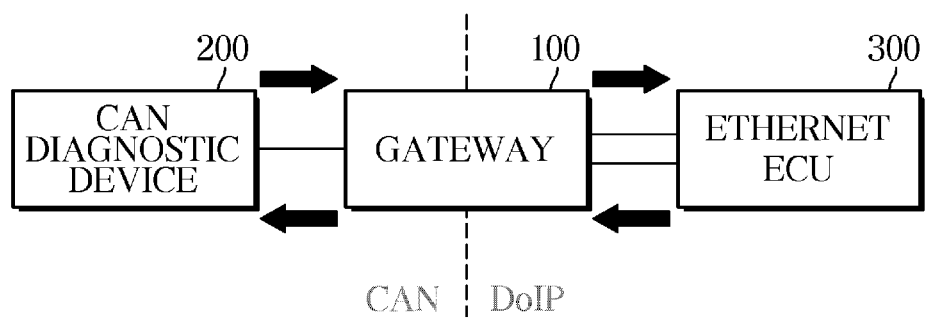
FIGS. 6 and 7 are diagrams for illustrating forms of a communication method of controller.
Figure 7:
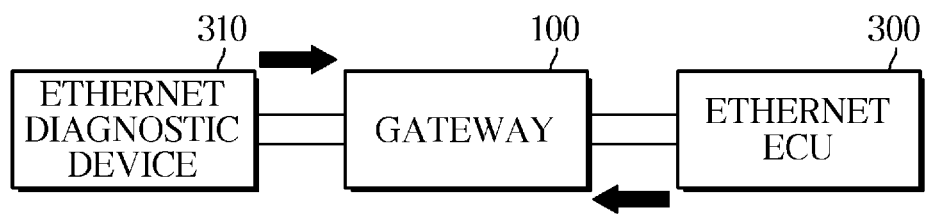

Meanwhile, the gateway 100 illustrated in FIGS. 6 and 7 is shown to be connected between the diagnostic devices 200 and 310 and the ethernet ECU 300. However, the gateway 100 does not perform the TP processing and allows the ethernet ECU 300 to provide a diagnostic message directly to the diagnostic device.

According to one aspect of the disclosed invention, it is possible to reduce the excessive load of the central processing unit by eliminating the conversion process between the diagnostic device and the controller using different protocols. Therefore, the controller diagnosis process of the vehicle may be efficiently performed.

It will be appreciated that, the disclosed embodiments and implementations may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments and implementations of the disclosure have thus far been described with reference to the accompanying drawings. It will be obvious to those of ordinary skill in the art that the disclosure may be practiced in other forms than the exemplary embodiments and implementations as described above without changing the technical idea or essential features of the disclosure. The above exemplary embodiments and implementations are only by way of example, and should not be interpreted in a limited sense.

What is claimed is:

1. A communication method of a controller, comprising:
transmitting, by a diagnostic device, a diagnostic information request and attribute information of the diagnostic device to an Ethernet electronic control unit (ECU), wherein the attribute information comprises a DoIP (Diagnostic over IP) header;
in response to the diagnostic information request, determining, by a processor, a protocol type of the diagnostic device based on the attribute information;

controlling, by the processor, the Ethernet ECU to perform protocol conversion according to the determination result; and receiving, by the processor, a diagnostic message from the Ethernet ECU in response to the diagnostic information request by the diagnostic device, wherein, in response to the diagnostic information request, determining the protocol type of the diagnostic device based on the attribute information comprises:

determining, by the processor, that the diagnostic device is an Ethernet diagnostic device when a number of bytes of a payload of the DoIP (Diagnostic over IP) header is greater than or less than a predetermined number of bytes.

2. The communication method according to claim 1, wherein the diagnostic device comprises any one of a controller area network (CAN) diagnostic device or the Ethernet diagnostic device.

3. The communication method according to claim 2, wherein, in response to the diagnostic information request, determining the protocol type of the diagnostic device based on the attribute information comprises:

determining whether the diagnostic device is the CAN diagnostic device or the Ethernet diagnostic device based on the attribute information including Protocol Control Information (PCI).

4. The communication method according to claim 3, wherein, in response to the diagnostic information request, determining the protocol type of the diagnostic device based on the attribute information comprises:

determining that the diagnostic device is the Ethernet diagnostic device when the number of bytes of the payload of the DoIP (Diagnostic over IP) header is 12 bytes and a SID (Service ID) belongs to a fifth byte of the payload.

5. The communication method according to claim 3, wherein, in response to the diagnostic information request, determining the protocol type of the diagnostic device based on the attribute information comprises:

determining that the diagnostic device is the CAN diagnostic device when the number of bytes of the payload of the DoIP (Diagnostic over IP) header is 12 bytes and the PCI information belongs to a fifth byte of the payload.

6. The communication method according to claim 2, wherein receiving the diagnostic message from the Ethernet ECU in response to the diagnostic information request by the diagnostic device comprises:

converting the diagnostic message into a divided CAN frame when the diagnostic device is the CAN diagnostic device.

7. The communication method according to claim 2, wherein receiving the diagnostic message from the Ethernet ECU in response to the diagnostic information request by the diagnostic device comprises:

not converting the diagnostic message when the diagnostic device is the Ethernet diagnostic device.

8. A communication device of a controller, comprising:
a diagnostic device;
an Ethernet electronic control unit (ECU) configured to receive a diagnostic information request and attribute information from the diagnostic device and provide a diagnostic message to the diagnostic device, wherein the attribute information comprises a DoIP (Diagnostic over IP) header; and a processor configured to:
determine a protocol type of the diagnostic device based on the attribute information, and
control the Ethernet ECU to perform protocol conversion according to the determination result, wherein the processor is configured to determine that the diagnostic device is an Ethernet diagnostic device when a number of bytes of a payload of the DoIP (Diagnostic over IP) header is greater than or less than a predetermined number of bytes.

9. The communication device according to claim 8, wherein the diagnostic device comprises any one of a controller area network (CAN) diagnostic device or the Ethernet diagnostic device.

10. The communication device according to claim 9, wherein the processor is configured to determine whether the diagnostic device is the CAN diagnostic device or the Ethernet diagnostic device based on the attribute information including Protocol Control Information (PCI).

11. The communication device according to claim 10, wherein the processor is configured to determine that the diagnostic device is the Ethernet diagnostic device when the number of bytes of the payload of a DoIP (Diagnostic over IP) header is 12 bytes and a SID (Service ID) belongs to a fifth byte of the payload.

12. The communication device according to claim 10, wherein the processor is configured to determine that the diagnostic device is the CAN diagnostic device when the number of bytes of the payload of a DoIP (Diagnostic over IP) header is 12 bytes and the PCI information belongs to a fifth byte of the payload.

13. The communication device according to claim 9, wherein the Ethernet ECU is configured to convert the diagnostic message into a divided CAN frame when the diagnostic device is the CAN diagnostic device.

14. The communication device according to claim 9, wherein the Ethernet ECU is configured not to convert the diagnostic message when the diagnostic device is the Ethernet diagnostic device.

15. The communication device according to claim 8, wherein the predetermined number of bytes is 12 bytes.

16. The communication method according to claim 1, wherein the predetermined number of bytes is 12 bytes.

17. A communication method of a controller, comprising:
transmitting a diagnostic information request and attribute information of a diagnostic device to an Ethernet electronic control unit (ECU);
in response to the diagnostic information request, determining a protocol type of the diagnostic device based on the attribute information;
controlling the Ethernet ECU to perform protocol conversion according to the determination result; and
receiving a diagnostic message from the Ethernet ECU in response to the diagnostic information request by the diagnostic device, wherein
the diagnostic device comprises any one of a controller area network (CAN) diagnostic device or an Ethernet diagnostic device,
in response to the diagnostic information request, determining the protocol type of the diagnostic device based on the attribute information comprises determining whether the diagnostic device is the CAN diagnostic device or the Ethernet diagnostic device based on the attribute information including Protocol Control Information (PCI), and in response to the diagnostic information request, determining the protocol type of the diagnostic device based on the attribute information comprises:
    determining that the diagnostic device is the Ethernet diagnostic device when a length of a payload of a DoIP (Diagnostic over IP) header is not 12 bytes.

18. The communication method according to claim 17, further comprising relaying communication between the diagnostic device and the Ethernet ECU via a gateway, wherein the performing of the protocol conversion by the Ethernet ECU relieves a processing load of the gateway.

19. The communication method according to claim 1, further comprising relaying communication between the diagnostic device and the Ethernet ECU via a gateway, wherein the performing of the protocol conversion by the Ethernet ECU relieves a processing load of the gateway.

20. The communication device according to claim 8, further comprising a gateway coupled between the diagnostic device and the Ethernet ECU, wherein the performing of the protocol conversion by the Ethernet ECU relieves a processing load of the gateway.

* * * * *